(12) United States Patent
Argawal et al.

(10) Patent No.: US 8,341,283 B2
(45) Date of Patent: Dec. 25, 2012

(54) METHOD AND SYSTEM FOR PEER-TO-PEER CONTENT DISSEMINATION

(75) Inventors: Sachin Kumar Argawal, Berlin (DE); Jatinder Pal Singh, Mountain View, CA (US)

(73) Assignee: Deutsche Telekom AG, Bonn (DE)

( * ) Notice: Subject to any disclaimer, the term of this patent is extended or adjusted under 35 U.S.C. 154(b) by 609 days.

(21) Appl. No.: 11/953,165

(22) Filed: Dec. 10, 2007

(65) Prior Publication Data

US 2008/0155120 A1 Jun. 26, 2008

(30) Foreign Application Priority Data

Dec. 8, 2006 (EP) .................................. 06025429

(51) Int. Cl.
*G06F 15/16* (2006.01)
*G06F 7/00* (2006.01)
*G01R 31/18* (2006.01)

(52) U.S. Cl. ......... 709/231; 707/622; 370/230; 709/232

(58) Field of Classification Search .................. 370/230, 370/233, 392, 432; 705/51, 57; 707/2, 100, 707/101, 201, 622; 709/203, 224, 228, 233, 709/242, 231, 232; 713/153, 169
See application file for complete search history.

(56) References Cited

U.S. PATENT DOCUMENTS

| | | | |
|---|---|---|---|
| 6,980,518 B1 | 12/2005 | Sun et al. | |
| 2001/0001852 A1* | 5/2001 | Rovinelli et al. | 703/22 |
| 2004/0107242 A1* | 6/2004 | Vert et al. | 709/203 |
| 2005/0068892 A1* | 3/2005 | Roberts et al. | 370/233 |
| 2005/0091167 A1* | 4/2005 | Moore et al. | 705/57 |
| 2005/0203851 A1* | 9/2005 | King et al. | 705/51 |
| 2006/0007947 A1* | 1/2006 | Li et al. | 370/432 |
| 2006/0020560 A1* | 1/2006 | Rodriguez et al. | 705/75 |
| 2006/0047948 A1* | 3/2006 | Shen et al. | 713/153 |
| 2006/0089997 A1* | 4/2006 | Inokuchi | 709/228 |
| 2006/0149753 A1* | 7/2006 | Medard et al. | 707/100 |
| 2007/0064702 A1* | 3/2007 | Bates et al. | 370/392 |
| 2007/0094279 A1* | 4/2007 | Mittal et al. | 707/100 |
| 2008/0005120 A1* | 1/2008 | Li | 707/10 |

FOREIGN PATENT DOCUMENTS

| | | |
|---|---|---|
| EP | 1427170 | 6/2004 |
| WO | WO 0178420 A1 * | 10/2001 |

OTHER PUBLICATIONS

Author: Bram Cohen Title: Incentives Build Robustness in BitTorrent Date: May 22, 2003.*

Jianming Fu; Hui Fan; , "Assigning Block Size Based on Speculation for Parallel Downloading," Computer and Information Technology, 2006. CIT '06. The Sixth IEEE International Conference on , vol., No., pp. 119, Sep. 2006.*

(Continued)

*Primary Examiner* — Jeffrey R Swearingen
*Assistant Examiner* — Taylor Elfervig
(74) *Attorney, Agent, or Firm* — Leydig, Voit & Mayer, Ltd.

(57) ABSTRACT

A method is provided for delivery of content data to a plurality of hosts. Each host is configured to operate as at least one of a content uploading host and a content downloading host. The plurality of hosts form a peer-to-peer network.

18 Claims, 11 Drawing Sheets

OTHER PUBLICATIONS

Sachin Agarwal; Shruti Dube;, "Gossip Based Streaming with Incentives for Peer Collaboration," Multimedia, 2006. ISM'06. Eighth IEEE International Symposium on, vol., No., pp. 629-636, Dec. 2006.*

Bharambe, A. R.; Herley, C.; Padmanabhan, V. N.;, "Analyzing and Improving a BitTorrent Networks Performance Mechanisms," INFOCOM 2006. 25th IEEE International Conference on Computer Communications. Proceedings, vol., No., pp. 1-12, Apr. 2006.*

Habib, A.; Chuang, J.;, "Service differentiated peer selection: an incentive mechanism for peer-to-peer media streaming," Multimedia, IEEE Transactions on, vol. 8, No. 3, pp. 610-621, Jun. 2006.*

Cohen, "Incentives Build Robustness in BitTorrent", May 22, 2003, pp. 1-5.

Padmanabhan, Wang, Chou, "Distributing Media Content using Cooperative Networking", Microsoft Research, http://www.research.microsoft.com/padmanab/projects/CoopNet/, Kunwadee Sripanidkulchai Carnegie Mellon University, pp. 1-12.

Silber, Sahu, Singh, Liu, "Agumenting Overlay Trees for Failure Resiliency", Hawthorne, NY 10532, pp. 1-7.

Verma, Ooi, "Controlling Gossip Protocol Infection Pattern Using Adaptive Fanout", Department of Computer Science National University of Singapore, Proceedings of the 25th IEEE International Conference on Distributed Computing Systems 2005, pp. 1-10.

Yang, De Veciana, "Service Capacity of Peer to Peer Networks", Department of Electrical and Computer Engineering, The University of Texas, IEEE INFOCOM 2004, pp. 1-11.

Knuth, Donald "The Art of Computer Programming" vol. 3, Sorting and Searching, second edition. Addison-Wesley, 1998. ISBN 0-201-89685-0, section 6.4: Hashing, pp. 513-558.

Kalogeraki V. et al., "A Local Search Mechanism for Peer-to-Peer Networks", Proceedings of the International Conference on Information and Knowledge Management CIKM, ACM, New York, NY, US, Nov. 4, 2002, pp. 1-8, XP002242714, paragraph [0001].

Steffen Schoenwiese: :"Das BitTorrent Protokoll" Internet Citation, (online), Jun. 2004, XP002418252; retrieved from the Internet: URL:http://dud.inf.tu-dresden.de/kriegel/ss04/hauptseminar/Schoewnwiese20 04_HAbitTorrent.pdf; retrieved on Feb. 2, 2007, paragraphs 02.1, 02.3, 2.5.1.

JDK 1.4.2 Serialization-related APIs & Developer Guides—from Sun Microsystems; http://java.sun.com/j2se/1.4.2/docs/guide/serialization/; 2002; 2 pages.

* cited by examiner

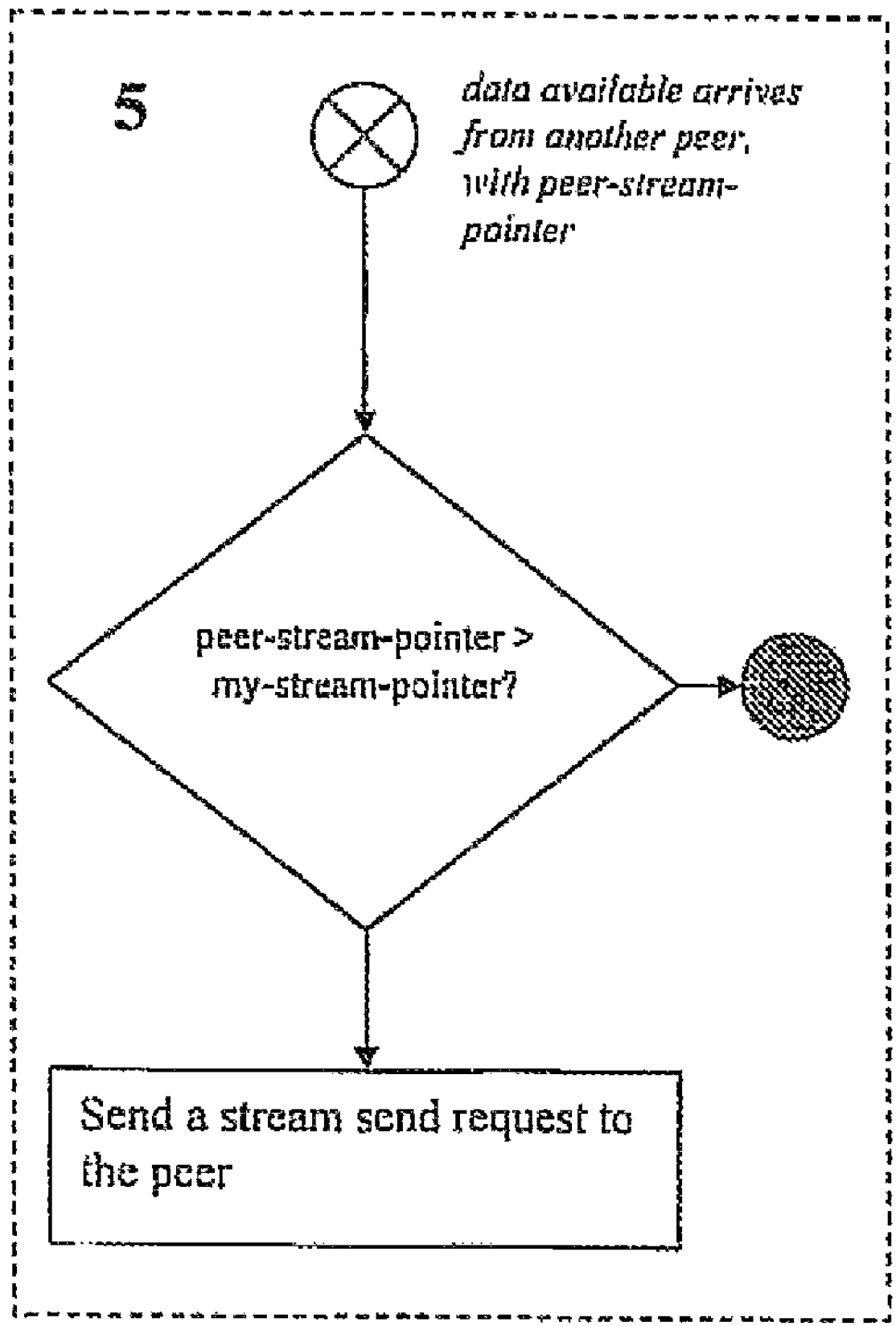

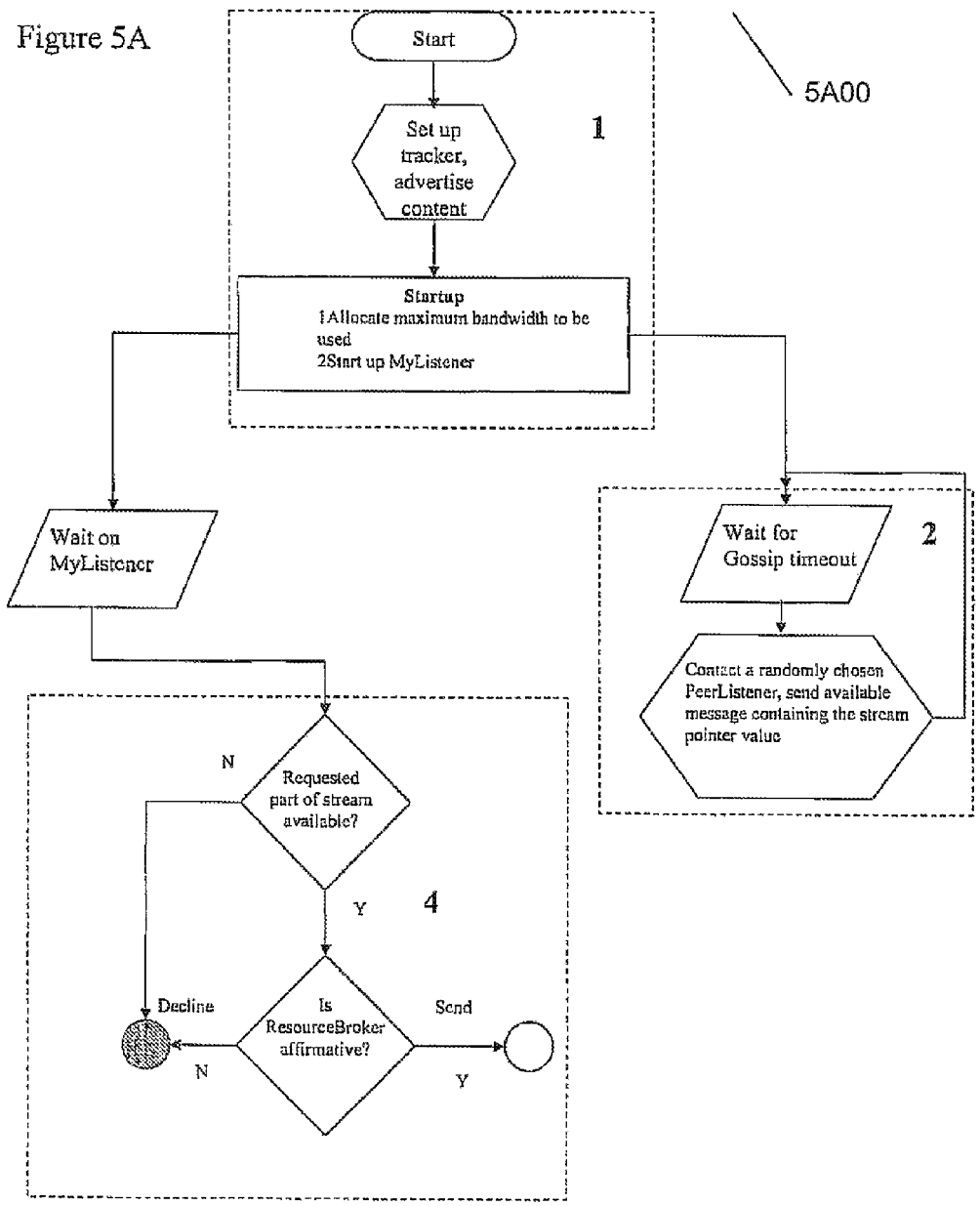

METHOD AND SYSTEM FOR PEER-TO-PEER CONTENT DISSEMINATION

CROSS REFERENCE TO RELATED APPLICATIONS

This application claims the benefit of European Patent Application No. EP 06 025 429, filed Dec. 8, 2006, which is hereby incorporated by reference herein.

FIELD

The present invention relates to a method and a communication system that allows communication between hosts, called peers, that cooperate to form a peer-to-peer network. The communication between peers may pertain to, for example, data dissemination or multimedia streaming from a source peer to other peers in the peer-to-peer network. In particular, the invention may be used for audio and/or video streaming in live and on-demand content delivery scenarios. It can also be used in multi-way live communication, such as an audio/visual multiple client chat room.

BACKGROUND

Media streaming from a server in the Internet to a plurality of clients via unicast connections has limitations due to a bandwidth ceiling of the network connections at the server.

However, media streaming in a peer-to-peer system alleviates this limitation by allowing a user to receive media content from any peer which has content instead of limiting the content dissemination capability to the server only.

Therefore, peer-to-peer (p2p) systems have become increasingly popular for applications like file sharing and media streaming. Several of such systems in use today employ different protocols and mechanisms for data dissemination amongst the peers.

The participants or hosts in a p2p system are typically heterogeneous in both their upload and download bit rates, also called upload and download bandwidths. Home DSL connections, for instance, tend to have a higher downlink bandwidth than uplink bandwidth. For example, a user connected to a DSL broadband interface can use a 1 Mbps download bandwidth and a 128 kbps upload bandwidth. Thus, for streaming of media the hosts in the Internet may need to cooperatively send media contents to a receiving peer owing to the lack of sufficient upload bandwidth to match the playback rate of the media stream.

Unlike on-demand content, live video streams have characteristics of time dependent utility of data blocks. In addition, unlike data file sharing, a receiving peer should be able to receive contiguous stream blocks which are then played-back by the host. Hence a scheme like Bittorrent described in B. Cohen, "Incentives build robustness in bittorrent," proceedings of the 1st workshop on Economics of Peer-to-Peer Systems, June 2003, which performs exchange of random data blocks may not work well for multimedia streaming.

Several p2p multicast solutions, for instance as proposed in V. Padmanabhan et al., "Distributing streaming media content using cooperative networking," ACM NOSSDAV, 2002, are based on building an overlay tree rooted at the source and dissemination of content to all the peers in the tree. However such approaches face the challenges due to disconnections caused by leaving of peers from the topology. Several measures to troubleshoot the problem via establishing multiple paths and multiple trees have been proposed in works like J. Silber, S. Sahu, J. Singh, and Z. Liu, "Augmenting overlay trees for failure resiliency," IEEE Global Telecommunications Conference 2004.

Gossip based mechanisms have been investigated for their utility for peer to peer media streaming dissemination of data in a peer to peer system. These involve spreading of media blocks in a topology, in a manner like infectious virus spread in a population. As such a gossip pattern is followed by the hosts, the data block is eventually spread to all peers in the topology. The conformity of gossip based protocol to media streaming applications has been discussed in S. Verma, and W. Ooi, "Controlling gossip based protocol infection pattern using adaptive fanout," International Conference on Distributed Computing System, 2005.

In U.S. Pat. No. 6,980,518 B1 Sun et al. describe a multicast messaging system employing a gossip based method for recovery of missing messages. The recovery mechanism involves soliciting retransmission of missing messages using gossips.

SUMMARY

It is an aspect of the present invention to provide a method and a communication system which increase the content dissemination to certain hosts in a peer-to-peer network.

It is another aspect of the invention to associate peers which cooperate in delivering content data to other peers with higher stream download rates as compared to peers which do not or less distribute their content data to other peers.

It is another aspect of the invention to vary the download rate of peers proportionally to the useful content data uploaded by the peers. This approach makes the system resilient to malicious or selfish peers who may otherwise download content data at the expense of the proposed system's cumulative resources without contributing back to the system.

In an embodiment the present invention provides a method for delivery of content data to a plurality of hosts. Each host is configured to operate as at least one of a content uploading host and a content downloading host. The plurality of hosts form a peer-to-peer network. The method includes the step of providing at least a part of the content data by a content uploading host of the plurality of hosts. The method further includes the step of selecting, at the content uploading host of the plurality of hosts, a content downloading host using a weighted parameter determined on the basis of the content data sent from other hosts of the plurality of hosts, including the content downloading host, to the content uploading host. The method further includes the step of advertising an available part of the content data from the content uploading host to the selected content downloading host. The method further includes the step of sending a content block including the part of content data requested by the selected content downloading host from the content uploading host to the selected content downloading host. The method further includes the step of selecting, at a second content downloading host, a second content uploading host. The method further includes the step of soliciting at least a second part of the content data by the second content downloading host from the selected second content uploading host. The method further includes the step of sending, if available, a second content block including the second part of the content data requested by the selected second content downloading host from the second content uploading host to the second content downloading host, wherein the size of the second content block has been adjusted in a predetermined manner.

BRIEF DESCRIPTION OF THE DRAWINGS

Aspects of the present invention will now be described by way of exemplary embodiments with reference to the following drawings, in which:

FIG. 5A shows a flow chart of the operation of a source connected to the network of FIG. 1.

DETAILED DESCRIPTION

Figure 1:
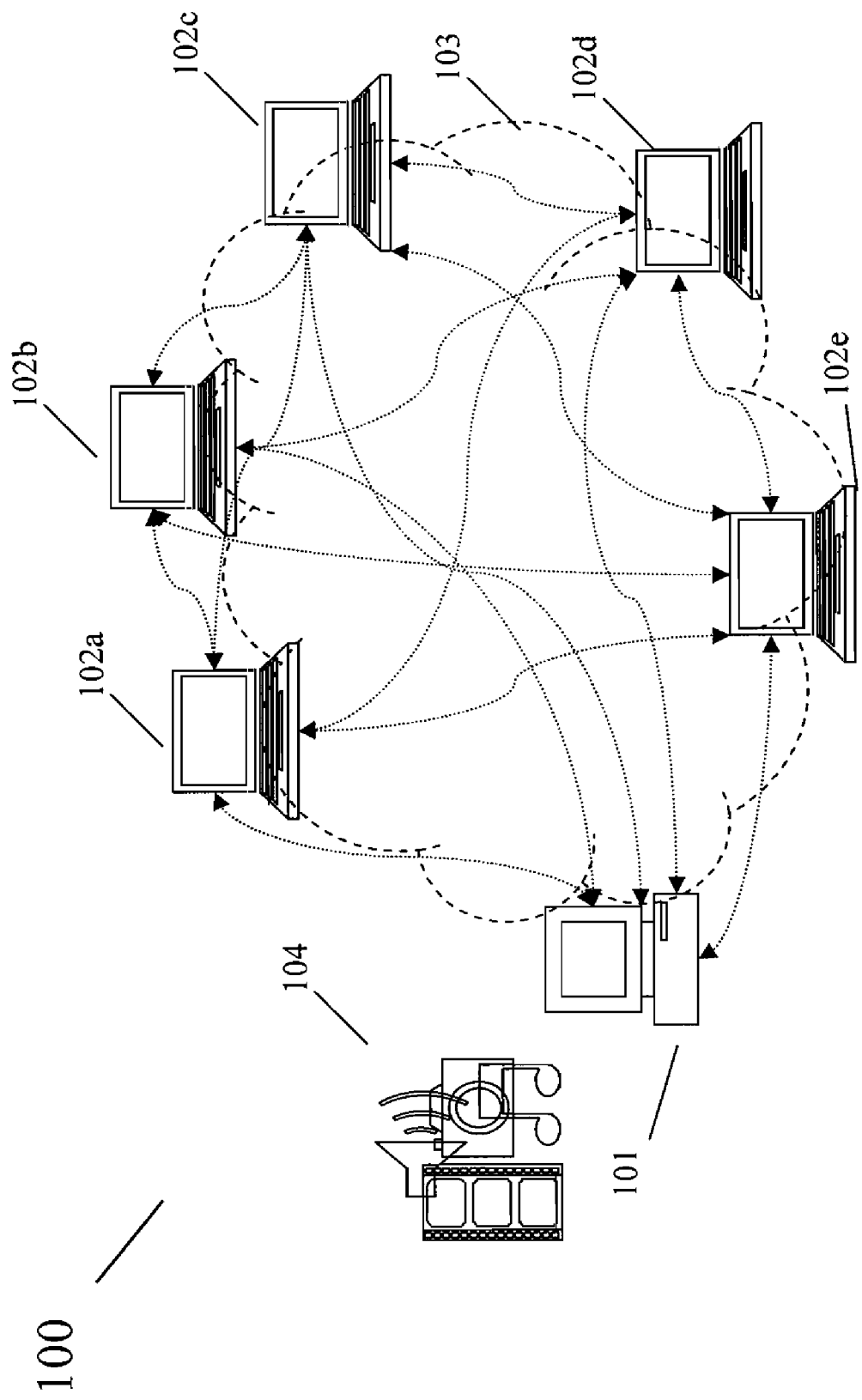
FIG. 1 shows a peer-to-peer overlay network.

In an embodiment the present invention provides a method for delivery of content data to a plurality of hosts each of which is adapted to operate as a content uploading and/or content downloading host, wherein the plurality of hosts forms a peer-to-peer network.

It should be noted that the content data represent, for example, a video and/or audio streaming which may initially be stored or generated in real time at a source which can be belong to the plurality of hosts. Moreover, the term "content uploading host" defines a host which is adapted to upload, i.e. send or deliver, at least a part of the content data to a host which functions as a content downloading host. In this connection the term "content downloading host" defines a host which is adapted to download, i.e. receive a part of the content data from a content uploading host.

The method includes the following steps:
a) Providing at least a part of the content data by at least one content uploading host which belongs to said plurality of hosts;
b) Selecting, at the content uploading host, a content downloading host by using a weighted parameter, e.g. a random number, which is determined on the basis of the content data which have been sent from other hosts including the selected content downloading host to the content uploading host;
b1) Advertising the available part or parts of content data from the content uploading host to the selected content downloading host;
b2) Sending a content block including the part of content data requested by the selected content downloading host from the content uploading-host to the selected content downloading host,
c) and/or
d) Selecting at a content downloading host a content uploading host;
c1) Solicitation of at least a part of the content data by the content downloading host from the selected content uploading host;
c2) Sending, if available, a content block including the part of content data requested by the selected content downloading host from the content uploading host to the content downloading host, wherein the size of the content block has been adjusted in a predetermined manner.

Steps b) to b2) define a push based communication phase wherein prior to send content data to a requesting content downloading host an information of the amount of content data stored at the content uploading host is transmitted to a selected content download host. Steps c) to c2), however, define a pull based communication phase, wherein a content download host directly requests content data from a selected content upload host.

In an exemplary embodiment the content data comprises a media streaming the data of which are delivered block wise using predetermined transport layer packets, e.g. TCP (Transport Control Protocol) or UDP (User Datagram Protocol) packets. With other words a media streaming comprises a lot of content data, for example 100 Megabyte (MB) which are divided, for example, into 100 blocks each having a size of 1024 Kilobyte (kB). It should be noted that the amount of data included in a "part of the content data" may but does not need to correspond to the amount of data covered by a content block.

In order to increase the download bandwidth of content download hosts during the push based communication phase step b) comprises the following steps:
Generating of a vector at the content uploading host, wherein the vector includes a number of elements each element representing the amount of content data received from a respective host which has sent content data to the content uploading host;
Normalizing the vector by dividing each element by the sum of all elements;
Generating a cumulative probability distribution function from the elements of the normalized vector;
Generating a random number between 0 and 1;
Choosing the interval defined by the cumulative probability distribution function in which the random number falls and selecting the weighted random number which lies in-between or exactly on the smallest or greatest value of the chosen interval;
associating the weighted random number with the element of the normalized vector, and
Selecting the content downloading host which corresponds to the associated element.

With such a method the download rate or download bandwidth of hosts operating as content downloading hosts can be dynamically adjusted on the basis of all content data uploaded by the hosts.

To guarantee that a content downloading host receives the whole content data requested steps b) to c2) are repeated at predetermined times until the whole content data have been delivered to the content downloading host.

In order to dynamically vary the download bandwidth of content download hosts during the pull based communication phase step b2) and/or step c2) comprises the step of adjusting the size of a content block to be sent on the basis of the amount of content data received from the other hosts at the content uploading host.

In particular the step of adjusting the content block size comprises the following steps:
Generating of a vector at the content uploading host which has received a Request to Send message from a content downloading host, wherein the vector includes a number of elements each element representing the amount of content data received from a respective host which has sent content data to the content uploading host;

Normalizing the vector by dividing each element by the sum of all elements;

Generating a cumulative probability distribution function from the elements of the normalized vector;

Choosing the element of the normalized vector which is associated with the content downloading host; and Sending to the content downloading host a content block with a size which is a proportional function of the chosen element of the normalized vector and a predetermined maximum block size.

In an exemplary embodiment a content uploading host is selected in the pull based communication phase randomly by the content downloading host.

The information on the current part or parts of content data stored at a content uploading host and/or a content downloading host comprises a content pointer.

In order to allow a content download host to determine during the push based communication phase to determine whether or not the advertised available part of the content data is needed step b1) comprises the following steps:

Advertising the available content from the content uploading host to the selected content downloading host in terms of a content pointer and Comparing at the content downloading host the received content pointer with its local content pointer to decide whether or not the advertised available content is needed.

In order to allow a content upload host to determine during the pull based communication phase to determine whether or not the requested part of the content data is available step c1) comprises the following steps:

Sending by the content downloading host its local content pointer to the selected content uploading host, and Comparing at the content uploading host the received local content pointer with its content pointer to decide whether or not the requested part of content is available.

It is to be noted that a content pointer specifies a) the starting byte of the content data which is needed at a peer if the message to be sent is a protocol message or b) the starting byte of the data in a complete media stream or data file if the message is a data message The method proposed above may slow down the dynamics of varying the download bandwidth associated to the content downloading hosts as time progresses. This is an artifact of the asynchronous download behavior of hosts because hosts may join or leave the peer-to-peer network randomly at different times. Then, peers that participate and upload content to other peers gain too much "favour" or credit in the a peerwise proportional scheme, blocking off newer peers. The dynamics of adjusting the download bandwidth of content downloading hosts by adjusting, for example the size content blocks to be delivered to the content downloading hosts should be "fast" in order to change the download bandwidth quickly as the peer-to-peer network evolves with time.

Therefore a decay back-off mechanism is designed to speed up the dynamics of adjusting the download bandwidth. This is achieved by multiplying the elements of the normalized vector stored at the content uploading host with a decay factor every time unit and wherein the elements of the normalized vector are updated each time further content data are received at the content uploading host.

In a exemplary embodiment the content data representing for example a complete movie is initially stored or generated in real-time at a source host which may belong to the plurality of hosts. At least a part of the content data is sent to at least some of the plurality of hosts. Normally, different parts of the content data are stored at separate hosts at different times.

In order to keep track of the hosts in the peer-to-peer network information of each host is stored for example at a tracker. The information comprises inter alia the address of each host as well as the current part or parts of content data stored at the respective host, i.e. the content pointer. Each host is adapted to retrieve the stored information.

If a new host joins the peer-to-peer network its maximum block size or its maximum uploading bandwidth to be used for uploading content data is adjusted.

The above mentioned technical problem is further solved by a communication system for delivery of content data in a peer-to-peer network which is for example an overlay network. The system comprises a plurality of hosts forming a peer-to-peer network, each host being adapted to upload and/or download at least a part of content data to be delivered.

Each host adapted to upload at least a part of the content data comprises a storage device for storing at least a part of the content data to be delivered; a first receiving device for receiving a Request to Send message from a content downloading host, a first controlling device for selecting a content downloading host by using a weighted parameter, e.g. random number, on the basis of the content data which have been sent from other hosts including the selected content downloading host to the respective host, a generation device for generating a content block with an adjustable block size, the content block including the part of content data requested by the selected content downloading host, a first transmitting device which are adapted to advertise the available part or parts of content data stored in the storage device to the selected content downloading host and to send a content block with an adjustable block size to the selected content downloading host, the content block including the part of content data requested by the selected content downloading host.

Each host adapted to download at least a part of a content comprises a second storage device for storing at least a part of content data received from at least one content uploading host, a second controlling device for selecting a content uploading host, a second transmitting device which are adapted to send a Request to Send message for at least a part of the content data to the selected content uploading host, and second receiving device adapted to receive a content block from the content uploading host including the part of content data requested by the selected content downloading host. In the detailed description the receiving device is also called "MyListener, whereas the transmitting device is also called "MySender".

Furthermore, each host may comprises a converting device for serializing packets dispensing from a content uploading host and for deserializing packets arriving at the content uploading host to a hash table.

In an exemplary embodiment a content pointer is associated with the content data stored in each content uploading and downloading host to indicate the current part or parts of content data stored therein. Each content uploading host further comprises a comparator device for determining whether the part of content data requested by a content downloading host is available, whereas each content downloading host comprises a comparator device for determining whether the part of content data advertised by a content uploading host is needed.

In an exemplary embodiment the first controlling device of the content uploading host is adapted to execute methods according to embodiments of the present invention.

One aspect of the proposed system is to deliver a copy of audio or video content to multiple connected hosts. The audio or video content is generated on-the-fly (live) or is stored initially at one of these hosts, henceforth referred to as the source, alluding to the fact that the content is initially provided by this computer. The proposed system seeks to disseminate content to multiple hosts using the least amount of prior coordination between the source and the hosts downloading the content, henceforth referred to as peers. Moreover, the proposed system sets up "real time" coordination between the various hosts participating in the stream in order to alleviate the source from having to supply a copy of the stream to each peer separately. Hosts coordinate exchanging parts of the stream amongst themselves and thus the requirement for high bandwidth at the source is avoided entirely.

The implemented streaming protocol uses an anti-entropy algorithm to spread blocks of the stream amongst the various peers of the overlay network. Spreading blocks means that the information is propagated in the network much like a virus spreads in a population or a rumour spreads in a crowd. This anti-entropy algorithm (sometimes called "gossip" algorithm) operates by randomly pushing/pulling blocks of the stream on stored on other peers. This is a completely distributed and asynchronous algorithm and true to the p2p model, does not depend on any centralized content broker.

FIG. 1 shows an exemplary communication system 100 which comprises a source host 101 and five hosts 102a, 102b, 102c, 102d, and 102e called peers which form an overlay peer-to-peer network 103 according to the present invention. The source host 101 may generate the media data stream of an audio and/or video content that is to be distributed amongst the exemplary hosts 102a, 102b, 102c, 102d, and 102e "on-the-fly". Alternatively, the media data stream may be initially stored or "cached" at the source host 101. In an exemplary scenario a live content stream is captured using an analog-to-digital converter for example, a video camera or a microphone 104 which associated with the source host 101.

The terminology peer used for hosts 102a, 102b, 102c, 102d, and 102e is synonymous with a cooperative entity, which for the present invention is aimed at collectively downloading and playing the audio/video stream in real time.

The overlay p2p network 103 connects the hosts 101, 102a, 102b, 102c, 102d, and 102e participating in the p2p streaming system. The hosts 101, 102a, 102b, 102c, 102d, and 102e are completely connected in the sense that any host can download the complete media data stream or parts of the media data stream from any other host in the P2p network 103. Such connectivity may be achieved by connecting each host to the Internet, for example. Implicit in this assumption is the unique addressability of each host i.e., each host has a unique identifier or address, e.g. IP address so that each host may communicate with a particular other host by specifying its unique address. Although Internet is a representative example for proving connectivity amongst the hosts, the proposed system is equally useful in any data network with the aforementioned characteristics as long as it can support a constant streaming rate at the peers, making them capable of playback the media data stream in real-time i.e., concurrently with stream reception, after allowing for a small buffer.

The source host 101 is connected to the overlay p2p network 103 through a broadband interface capable of carrying at least one copy of the media data stream into the p2p network 103. Each of the peers 102a, 102b, 102c, 102d, and 102e is adapted to receive, i.e download a part of the media data stream form the other peers 101, 102a, 102b, 102c, 102d, and 102e instead of just relying on the source host 101 to supply the content. The connections between the peers 101, 102a, 102b, 102c, 102d, and 102e in the p2p network 103 are time varying with peers contacting each other randomly in search of the required blocks of the media data stream. The arrows shown in FIG. 1 are therefore changing with time.

The peers 101, 102a, 102b, 102c, 102d, and 102e shown in FIG. 1 may be spread across a wide geographical area. Moreover, there is no centralized entity that coordinates the source host 101 and 101, 102a, 102b, 102c, 102d, and 102e participating in the communication system 100. The architecture of the scenario in FIG. 1 is therefore scalable and robust against any central point of failure or implosion problems at a central host.

Furthermore, it is assumed that there exists a special device called a tracker which may reside in any of the hosts 101, 102a, 102b, 102c, 102d, or 102e. The tracker keeps a list of all peers participating in the p2p network 103 to upload and/or download parts of the media data stream. This tracker is set up by the source host 101 at the commencement of media data streaming.

The hosts 101, 102a, 102b, 102c, 102d, or 102e are capable of concurrently uploading parts of the media data stream to different peers in dependence of its maximum uploading bandwidth. Peers can thus act as servers also called content uploading hosts while participating in the p2p network 103 to distribute content data. This property underlines the fundamental peer-to-peer value: pooling server bandwidth of each peer for content dissemination. The hosts 101, 102a, 102b, 102c, 102d, or 102e swap blocks of the media data stream amongst each other instead of downloading the media data stream from the source host 101 only as in a conventional client-server model.

These transactions between participating peers are controlled randomly with the peers downloading contiguous blocks of the media data stream by requesting required data stream blocks from different peers to rebuild the whole media data stream. Not every transaction results in a successful block download, but the overall effect is the download of contiguous blocks of the media data stream on each peer 102a, 102b, 102c, 102d, or 102e participating in the overlay network 103.

The overlay network 103 of FIG. 1 is highly dynamic and non-coherent due to the following reasons:

1. Unpredictable peer lifetimes: Peers can "leave" the overlay network 103 at any time, i.e., stop participating in the p2p streaming effort.
2. Varying peer bandwidth: The bandwidth available for uploading at least parts of the media data stream to the other peers and for downloading the media data stream from other peers varies with time across each peer. This is natural considering the sharing of bandwidth amongst the computer's applications (HTTP, FTP etc. for example) as well as the statistical multiplexing of data packets in the underlying data networks.
3. Peer heterogeneity: All peers may have different underlying connectivity to the overlay network. For example, in case of the Internet, some peers have asymmetrical DSL, others have T1 or T3 connectivity, while some others have wireless (GPRS, 3G) connectivity etc. Each of these underlying network connectivity technologies provides different bandwidth, latency, and throughput to the overlaid p2p application. Moreover, the processing power of the peers also varies.

Figure 2:
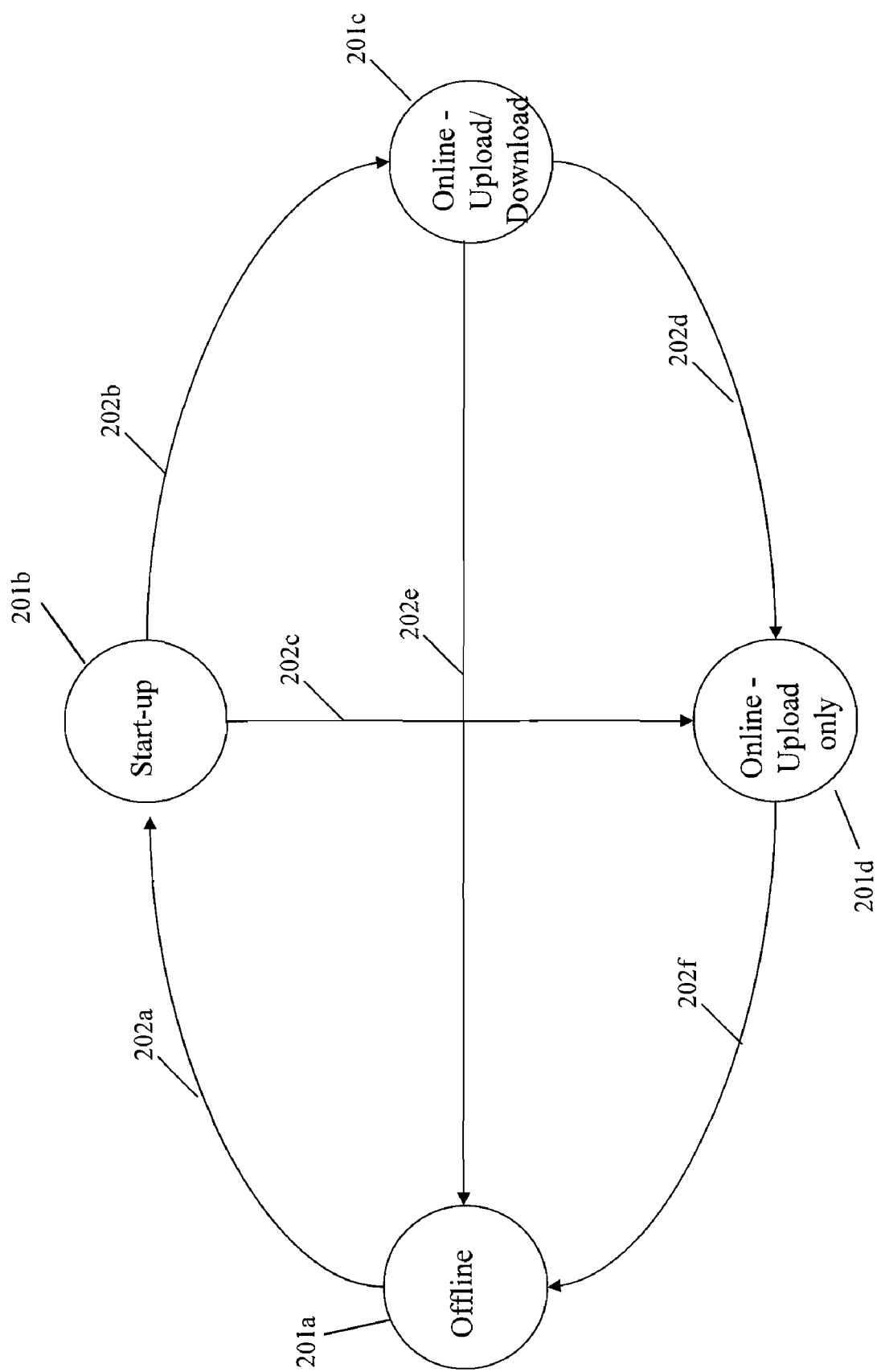
FIG. 2 shows a state diagram of a host.

FIG. 2 shows the states that source host 101 and the peers 102a, 102b, 102c, 102d, and 102e can assume while executing the method of the present invention in a distributed and asynchronous manner, as well as the transitions between these states.

A peer, e.g. peer 102a, is in the off-line state 201a when it is not actively involved in downloading, uploading or otherwise participating in the media data stream distribution: in other words, peer 102a is off-line. A peer enters the start-up state 201b when it joins the overlay p2p network 103 to participate in the media data stream distribution. The transition 202a characterizes this event.

State 201b is characterized in particular by source and peer discovery, application initialization, e.g. reserving resources like bandwidth for the application, NAT firewall traversal, etc. In case of the source host 101, state 201b also involves setting up a tracker, that is supposed to do book keeping about each peer which participates in the overlay network 103 and downloading the media data stream.

During the start-up phase various numerical parameters that correctly control the proposed algorithm are set up. These parameters include:

1. Gossip thread timeout: This is the time between successive advertising messages sent from a content uploading host to a selected content downloading host. This parameter is elaborated in the description of FIG. 3. This parameter is specified in milliseconds. Its value can be increased or decreased in order to slow or speed up the stream download rate respectively, subject to network and stream availability constraints of the overlay network.
2. Maximum Block size: This is the size of the largest single block carrying a predetermined amount of data of the media data stream transferred from one peer to another when stream blocks are transmitted. The block size is specified in kilobyte (kB).
3. Upload bandwidth: This parameter is the upper limit on the amount of upload bandwidth dedicated to uploading stream blocks to requesting peers. The upper limit enforces a control over the proposed system so that users can accomplish other network tasks such as browsing the web, for example without adversely affecting their experience due to hijacking of the upload bandwidth link of their network connections by the proposed system.

A peer enters the "Online—Upload/Download" state 201c via transition 202b which happens on the completion of the start-up phase. During the state 201c data blocks of the media data stream are uploaded from the source host 101 to at least one of the peers 102a, 102b, 102c, 102d, or 102e and downloaded and/or uploaded to and from the peers, respectively as will be described below in detail. It is to be noted that source host 101 only uploads data blocks but does not download data blocks from the peers 102a, 102b, 102c, 102d, or 102e participating in the streaming system, hence it enters the online-upload only state 201d after state 201b has been completed.

In the case of a fixed length media data stream e.g. a film, each peer will eventually complete downloading the whole film, thus ending up with a cached copy of the entire media data stream file just like the source host 101. These peers may decide to altruistically act as a source and upload the entire file to other requesting peers. The corresponding state of the peers is 201d reached via transition 202c once the download is complete. It is to be noted that the peers which have decided to act as content uploading peers or sources are called cooperative peers, whereas the peers which do not operate as content uploading peers are called non-cooperative peers. Only cooperative peers will be associated with higher download rates as will be discussed below.

A peer can leave the p2p overlay network 103 and return to the state 201a from states 201c or 201d via transitions 202e or 202f, respectively. The source host 101 can become offline only from state 201d via transition 202f.

Figure 3:
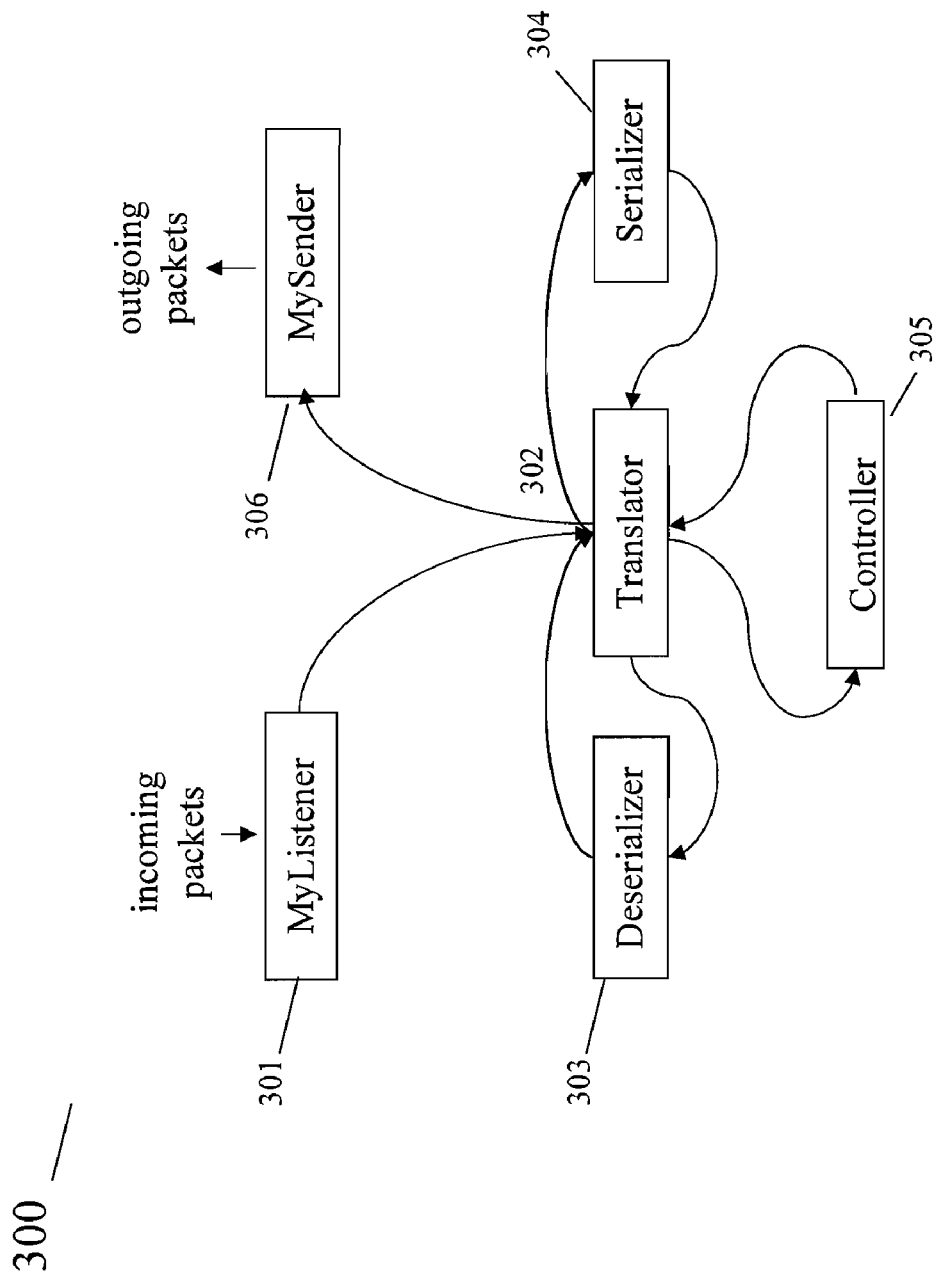
FIG. 3 shows a schematic block diagram of a host.

FIG. 3 shows a schematic block diagram 300 of the functionality of one of the peers 102a, 102b, 102c, 102d, or 102e connected to the p2p network 103 of FIG. 1.

The peer comprises a receiving component 301, called MyListener, which receives on a given port e.g. a given UDP port or a TCP port transport layer packets from an media streaming application running on another peer. The structure of the transport layer packet is described below with respect to FIG. 4. The payload of the data packets is in serialized form. Serialization is the process of conversion of a message e.g. media streaming protocol messages, or streaming data to a format that can be transmitted across a connection link of an underlying network (see for example (http://java.sun.com/j2se/1.4.2/docs/guide/serialization/).

A message containing data of a media stream is constructed by a host as a hash table which is described in Donald Knuth. The Art of Computer Programming, Volume 3: Sorting and Searching, Second Edition. Addison-Wesley, 1998. ISBN 0-201-89685-0. Section 6.4: Hashing, pp. 513-558. A hash table comprises key and value pairs.

MyListener 301 passes the incoming packet's payload to a translator component 302. The translator component 302 de-serializes, i.e. converts the serialized payload into a hash table with the help of a component 303, called deserializer, and stores these converted payload as a key and value pair into hash table. The hash table is then passed to a controller 305 which acts upon the message in accordance with a method as described later in connection with FIG. 5.

The controller 305 can use the stored <key> to lookup into a storage (not shown) to obtain the corresponding value contained in the hash table. Each hash table is destroyed at the end of the message parsing component of the controller 305.

The translator 302 also converts a de-serialized hash table message created by the controller 305 to a serialized message suitable for transmission in the payload of a packet. The serialization is performed with the help of a serializer 304. The serialized message is then transmitted over the underlying data network by a transmitting component 306, called MySender, to a requisite listening port, e.g. a UDP or a TCP port of another peer.

When any one of the peers 102a, 102b, 102c, 102d, or 102e of the communication system 100, for example peer 102a starts up in step 201b of FIG. 2, it first discovers all the other peers 102b, 102c, 102d, or 102e which operate as content uploading hosts through an out-of-band method. Such a method is described for instance by B. Cohen, "Incentives build robustness in bittorrent," proceedings of the 1st workshop on Economics of Peer-to-Peer Systems, June 2003. This method yields the network address of a tracker, which keeps track of the network addresses of the content uploading peers of the p2p network 103 which have already downloaded at least parts of the media data stream provided by the source host 101. The tracker can be the source host 101 itself, although this is not a requirement. In case the list of content downloading peers is very large, the tracker may limit the number of peer network addresses sent to a requesting peer without adversely affecting the peer-to-peer download process.

The operation of the communication system 100 is now illustrated in connection with FIGS. 5 and 5A.

Figure 5:
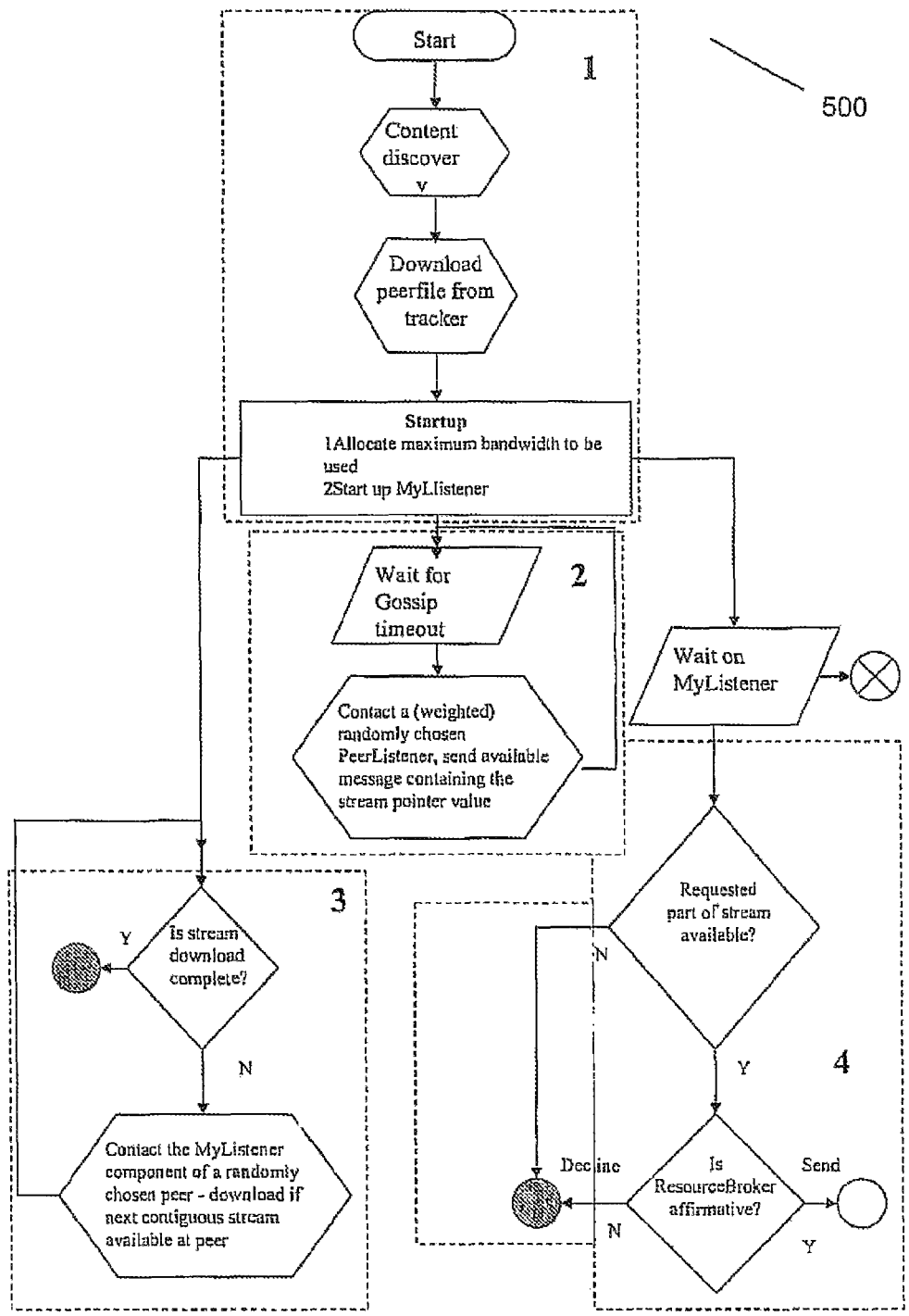
FIG. 5 shows a flow chart of the operation of a host connected to the network of FIG. 1.

Referring first to FIG. 5 which shows an exemplary flow chart 500 describing the operation of peer-to-peer application running on a peer 102b, 102c, 102d, or 102e other than the source host 101 which is controlled by the controller 305 of FIG. 3.

We now consider both the push based communication phase and the pull based communication phase.

A content downloading peer is said to be pulling a data block of the media data stream when it actively solicits each time unit the first data block or the next contiguous block of the media data stream from a randomly selected content uploading peer including the source host 101.

On the other hand, a content uploading peer is pushing a data block when it actively advertises the data block or data blocks of the media data stream it contains to send to a content downloading peer each time unit wherein the content downloading peer is randomly selected on the basis of a weighted parameter. The selecting procedure is described later. The selected content downloading peer in turn may request to download a required data block from the advertising host depending on whether it requires the advertised media data stream blocks. A preferred embodiment of the communication system 100 of FIG. 1 uses the pull and/or push based communication phases on each of the peers 102b, 102c, 102d, or 102e. The combination of both approaches results in faster stream download times achieved by the peers.

We return now to FIG. 5. The flow chart of FIG. 5 is divided into five functional units 1 through 5, as marked on FIG. 5 respectively. While the functional units are logically separated, they cannot be looked upon in isolation. These functional units which are used by the controller 305 of a peer are described hereunder:

Functional Unit 1:

It is assumed that a peer-to-peer application starts up on a peer, for example on peer 102a which desires to receive the entire media data stream. The application further starts the discovery procedure to find out all content uploading hosts, e.g. 102b, 102c, 102d, and 102e that have the data blocks of the media data stream that the peer controller 305 of peer 102a wants to download. This discovery procedure entails mapping the user's needed content to the tracker. The tracker supplies a list of at least some of the content uploading peers, called peer or hostfile, which have data blocks to upload to the requesting peer. The application then allocates the maximum upload bandwidth to peer 102a it is willing to contribute to the overlay network 103 in order to avoid bandwidth starvation to other applications running on the peer computer. The application also starts up the MyListener component 301 of FIG. 3 which can accept incoming packets from the other peers of the overlay network 103. The tracker for its part adds the network address of the peer 102a to the list of peers already participating in the media data stream dissemination.

Functional Unit 2:

The controller 305 implemented for example in peer 102a executes the steps of functional unit 2 during a push based communication phase. The controller 305 controls the advertisement of the parts of the media data stream that it has stored to upload. The available content is advertised in terms of a content pointer which represents the count of the number of contiguous blocks received and cached at the peer 102a. This count may be 0 initially, when the peer has downloaded no data of the media data stream from the other peers.

The advertisement of available data blocks is sent to a randomly selected peer every gossip thread time out (in milliseconds), which is a user configurable parameter.

Increasing this parameter will have a direct bearing on the throughput, i.e. download rates of the P2p streaming method, and will decrease the throughput as the available content will be advertised less frequently in the p2p network 103. On the other hand, a very small gossip thread time out may lead to network congestion due to a flood of packets in the network. To prevent undesirable packet time synchronization between peers a small random value (in milliseconds) is added or subtracted to the gossip thread time out during each invocation.

Functional Unit 3:

The controller 305 implemented for example in peer 102a and executes the operation steps of functional unit 3 during the pull based communication phase. It randomly selects a content uploading peer each time unit and requests that peer to send it the first or next contiguous data block of the media data stream in order to continue building up a copy of the entire media data stream. This overall method of downloading content is also termed as gossip pulling. The peer 102a now operating as a content downloading peer sends out each time unit its current stream pointer to a randomly chosen peer operating as a content uploading peer in the hope that the stream pointer of the selected peer will be more advanced than its own stream pointer and that it will volunteer to upload the requested block of data to peer 102a.

The peer 102a sends out these requests every time unit, called request time out, which runs to some milliseconds, and is a user configurable parameter. Slowing down this parameter will have a direct bearing on the throughput and thus to the download rates of the P2p media streaming method, and will decrease the throughput as the overlay network 103 will request less frequently for the content. On the other hand, a very small request time out may lead to network congestion due to a flood of request packets in the network. To prevent undesirable packet synchronization between peers a small random value (in milliseconds) is added or subtracted to the request time out during each invocation.

Functional Unit 4:

The operation steps of functional unit 4 a executed by a controller 305 of FIG. 5 which is implemented in a peer operating as a content uploading peer. The request generated by the controller 305 of peer 102a in functional unit 3 is received by the randomly chosen peer, e.g. peer 102b and passed on to the functional unit 4 of that peer 102b. The functional unit 4, which waits on its MyListener component 301 to hear a request, first checks to see if the requested data block is already cached on its storage which may be a harddisk (not shown). The check is done by simply comparing the local stream-pointer of peer 102b with the stream pointer of the requesting peer 102a. In case the local stream pointer of peer 102b is more advanced than the stream pointer received from peer 102a controller 305 of peer 102b invokes a functional operation, called ResourceBroker, to make a decision whether to send a data block of the media data stream to the requesting peer 102a. The ResourceBroker will make the decision of whether to send a block to peer 102a based on the following requirements:

1. Is upload bandwidth available?
2. Is there an incentive to send a block of data to the requesting peer 102a?

If the ResourceBroker is affirmative then the controller 305 generates a data message as illustrated below in connection with FIG. 4. The data message contains a block, i.e. a predetermined number of data bytes of the media data stream for the requesting peer 102a. The block size is usually determined by the ResourceBroker of functional unit 4 as explained later. In case the difference between the local stream pointer of the content uploading peer 102b and the stream pointer of the requesting peer 102a is less than this block size, the block size to be sent is the size of this difference.

Functional Unit 5:

The functional unit 5 is invoked by the controller 305 of FIG. 3 at the content downloading peer 102a when it receives a push-gossip message, i.e. an advertisement of the available data blocks from a content uploading peer, for example peer 102b. If the advertised stream pointer of the content uploading peer 102b is greater than the stream pointer of content downloading peer 102a then content downloading peer 102a requests the content uploading peer 102b to send a data block of the media data stream by sending a Request to Send message to the content uploading peer 102b (see FIG. 4 and the description in the Section titled "Communication Protocol Specification").

We turn now to FIG. 5A showing the functional unit implemented on the source host 101. When a peer-to-peer application is running on the source host 101 and the controller 305 shown in FIG. 3 is embodied by the source host 101, the functionality is different from that illustrated in FIG. 5. The peer-to-peer application and source controller functionality is illustrated by the flow chart shown in FIG. 5A.

The entire media data stream to be delivered is created at the source host 101 and thus the source host 101 is always a provider of data blocks of the media data stream to the other peers 102a to 102e. Therefore, the source host 101 never tries to download or "pull" data blocks of the media data stream from other peers.

The functional unit 1 in FIG. 5A, performs the following functions:

1. Setting up a tracker A tracker keeps a dynamic list of peers that join and leave the p2p network 103. This enables new peers to contact the tracker in order to download a current list of peers from which the stream download can commence. In case the source host 101 itself volunteers to be tracker it guarantees that every other peer 102a to 102e will have access to at least one peer that holds the content.
2. Content advertisement through out-of-band means Once the tracker is setup the source host 101 needs to advertise the tracker's location to enable peers to connect to the media data stream. There are several out-of-band, i.e. outside of the core protocol, methods for achieving this. For example, the description of the content and the tracker's network address could be published on a website.

The upload bandwidth allocation and MyListener 301 setup functionality is similar to that of the functional unit 1 of FIG. 5.

The controller functional units 2 and 4 shown in FIG. 5A are identical in functionality to the corresponding functional units 2 and 4 as shown in FIG. 5.

A key point to be noted is that the source host 101 need not furnish the media data stream to all peers that try to pull the media data stream. As shown in FIG. 5A, the source host 101 can decline a request if there is no upload bandwidth. It is to be noted, that the distributed incentive mechanisms discussed in the next section are not directly applicable to the source host 101 because a source is necessarily altruistic as it never downloads its own media data stream from other peers.

Method for Selecting a Content Downloading Peer

The selecting scheme employed by the ResourceBroker of functional unit 4 of FIG. 5 is described next.

Peers 101, 102a to 102e of the communication system 100 are independent entities and can be expected to act for their own selfish gain. In the case of a p2p streaming dissemination this gain is the rate of stream download received by the peer. The proposed selecting scheme needs to leverage this selfish requirement of peers by providing a higher rate of stream downloads to those peers that contribute more upload bandwidth than other peers to the communication system 100. Ideally, the rate of stream download on a peer i must be $$R_i = \frac{\mu_i}{\sum_j \mu_j}, \quad (1)$$

where $\mu_i$ denotes the bandwidth contribution of peer i back to the p2p network 103 from the beginning of the stream downloading process on peer $$i. \sum_j \mu_j$$

is the sum of uploading bandwidth contributions of all peers in the network 103 and thus represents the total available uploading bandwidth in the p2p network 103. Equation (1) has sometimes been called "Global proportional fairness (X. Yang and G. de Veciana, "Service Capacity of Peer-to-Peer Networks", in Proc. of IEEE Infocom, 2004). However, it is not a practical selecting mechanism because implicit in the equation is the assumption of a fair and centralized measuring authority to determine the $\mu_i$.

A related incentive mechanism is peer wise proportional fairness scheme described by X. Yang and G. de Veciana, "Service Capacity of Peer-to-Peer Networks", in Proc. of IEEE Infocom, 2004. Each peer makes decisions about sharing their own bandwidth based upon the bandwidth received from other peers. All measurements of this received bandwidth are local, and so the method is completely distributed.

The selecting scheme according to the present invention solves some very important drawbacks of the Global proportional fairness and peerwise proportional fairness:

It allows for peers to become part of the live streaming effort by joining the download operation at any time, the requirement of joining at the beginning exactly in synchronized time with the other peers is removed as compared to peerwise proportional fairness.

The dynamics of the incentive and fairness system are faster than pure peerwise proportional fairness. This means that the proposed incentive system reacts quickly to changes in bandwidth, peer status (as peers turn on or off) and network size, thus leading to much better scalability of the content streaming protocol.

Preferential Selection of Cooperative Peers During a Push-based Communication Phase The term cooperative peer defines a peer which contributes uploading bandwidth to the p2p network 103, i.e. sends data blocks of a media data streaming to other peers.

Each peer in the p2p network 103 of FIG. 1 maintains a vector $V = \{V[0], V[1], \ldots V[n-1]\}$, wherein each of the elements $V[0], V[1], \ldots V[n-1]$ represents the amount of content data in kB received from a respective peer and wherein the elements are labeled without loss of generality as 0 to n-1. In the present case n is 4. To facilitate the illustration of the selecting schema, it is now assumed that peer 102a works as a content uploading peer. In this case the vector V stored at peer 102a comprises the elements V(0) to V(3) which represent the amount of content data received from the peer 102b, 102c, 102d and 102e, respectively. This vector is normalized to $V_n$ by dividing V by the sum of all elements of V, i.e. the total amount of content data received at peer 102a, so that the sum of elements of $V_n$ is 1.

Now, a cumulative probability vector $P=\{P[0], P[1], \ldots P[n-1]\}$ is constructed as follows:

$$P[0]=V_n[0]$$

$$P[1]=P[0]+V_n[1]$$

$$P[2]=P[1]+V_n[2]$$

...

$$P[i]=P[i-1]+V_n[i]$$

...

$$P[n-1]=1$$

Next a random number uniformly distributed between 0 and 1 is generated by the controller 305 of peer 102a. From the cumulative probability vector P, the weighted parameter, i.e. the element of the normalized vector with the index n corresponding to the interval in which this random number falls is retrieved. This index represents the peer to which the available message will be pushed to from peer 102a. The operation of the selecting scheme executed by the Resource-Broker of controller 305 of peer 102a is demonstrated now by the following example:

It is assumed again, that peer 102a functions as a content uploading peer during a push based communication phase.
Let n=4(peers labeled 0, 1, 2, 3)
Let V=[1 kB, 2 kB, 3 kB, 4 kB]
then sum (V)=10 kB
$V_n$[0.1, 0.2, 0.3, 0.4]
P=[0.1, 0.3, 0.6, 1]

Now, the random number 0.546 is generated which falls in the interval 0.3<0.546>0.6, wherein the value 0.3 is associated with the element labeled 1 and the value 0.6 is associated with the element labeled 2. It is assumed, that element labeled 0 corresponds to peer 102b which has uploaded 1 kB of content data, element labeled 1 corresponds to peer 102c which has uploaded 2 kB, element labeled 2 corresponds to peer 102d which has uploaded 3 kB and element labeled 3 corresponds to peer 102e which has uploaded 4 kB to peer 102a. As shown in the example, the elements of vector V are ordered such that the first element belongs to the peer with the lowest upload bandwidth whereas the last element corresponds to the peer with the highest upload bandwidth with respect to peer 102a.

Figure 6:
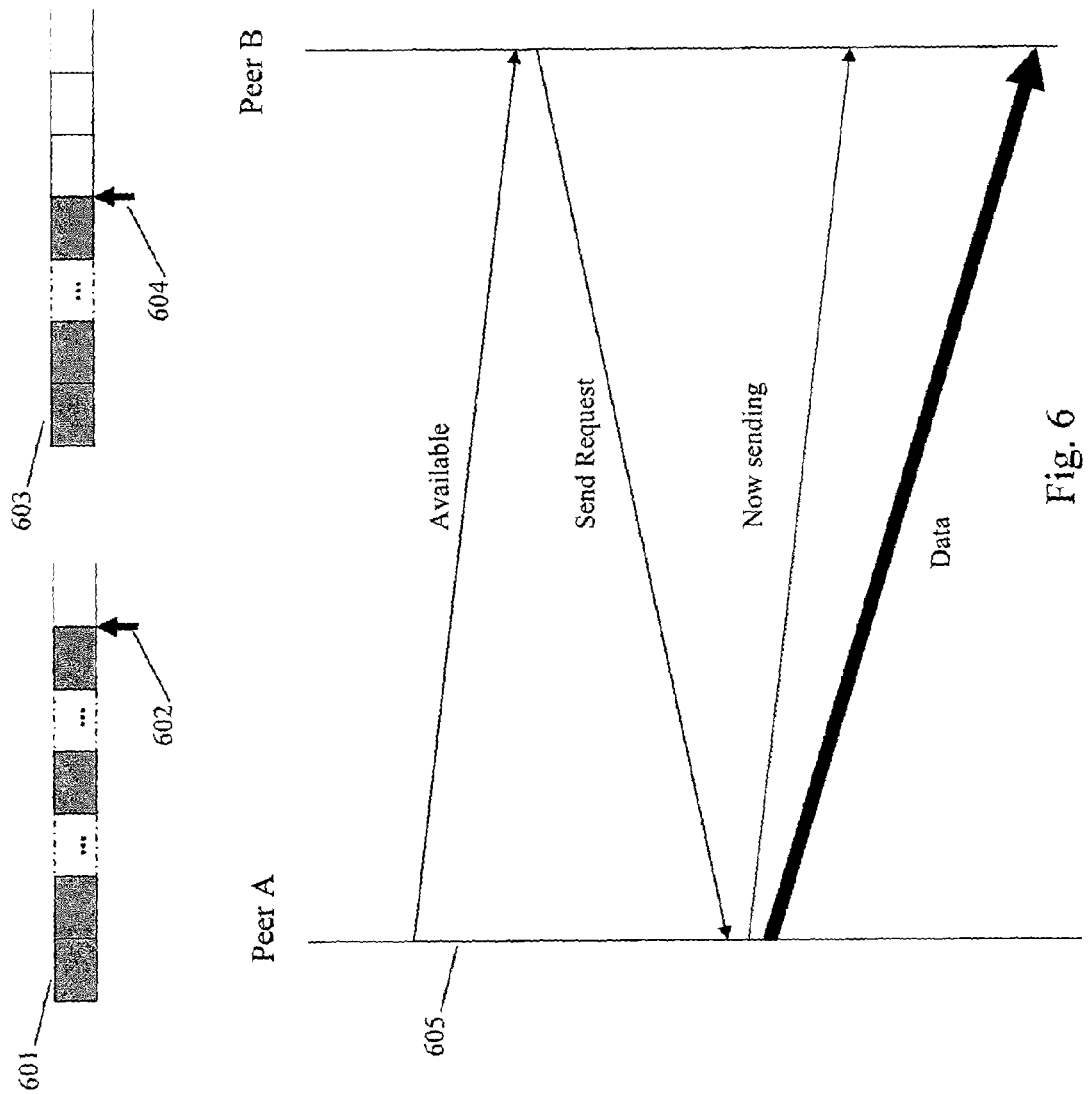
FIG. 6 shows a time diagram of a push based content dissemination.

Thus, the corresponding element with index 2 is selected in the above example. As a result, the ResourceBroker of controller 305 causes MySender 306 of peer 102a to send a protocol message including the advertising information "Available" to peer 102c, which corresponds to element with index 2, as shown in FIG. 6.

This selecting scheme ascertains that a peer just operating as a content download peer receives the required entire media data stream the faster the more upload bandwidths it has spent to the other peers.

Figure 7:
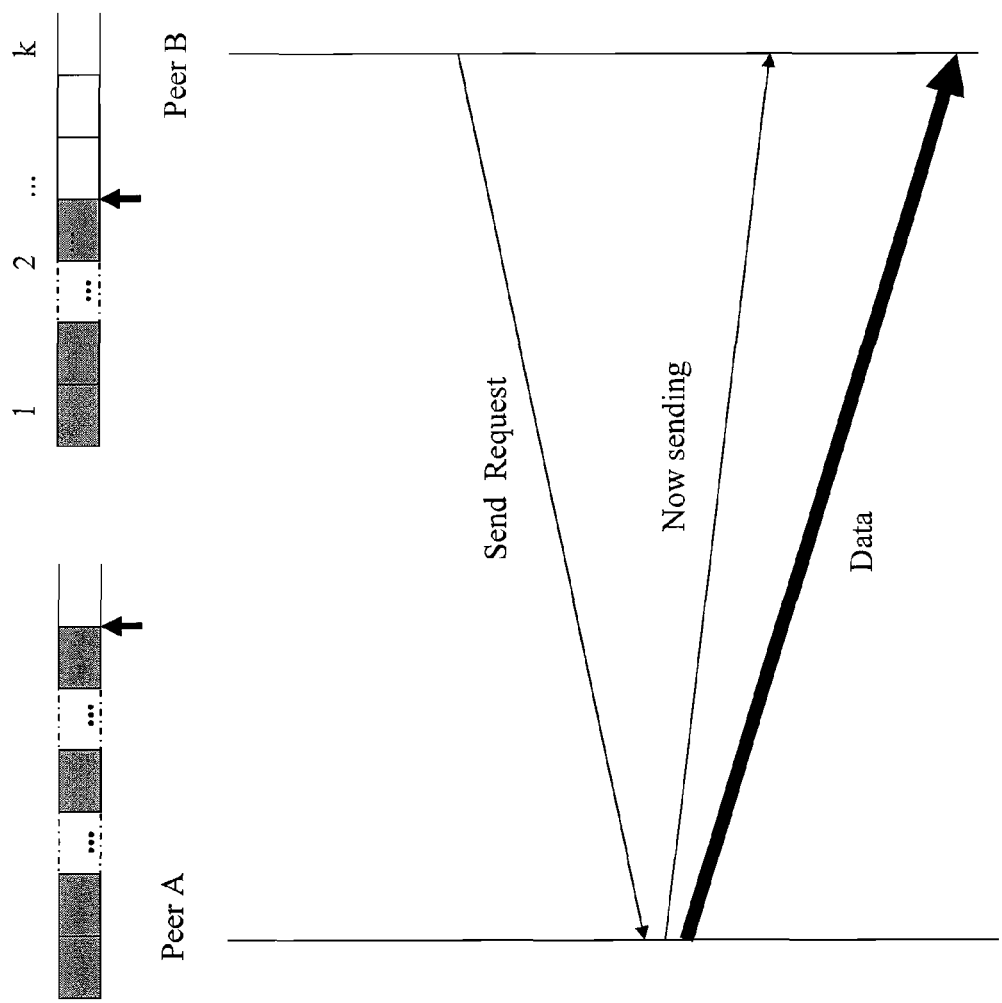
FIG. 7 shows a time diagram of a pull based content dissemination.

Adjusting the Block Size while Serving Data to a Requesting Peers During a Pull-based Communication Phase When a peer i operating as a content uploading peer receives a "Request to Send" message from a peer k operating as a content downloading peer, as shown in FIG. 7, it must determine the uploading rate at which it will send data of the media data stream to the requesting peer. Herein lies a non-causal problem:

At a slightly later time, it is supposed that a preferred peer j, i.e with an $V_n[j]>V_n[k]$ of the normalized vector V requests a data block from peer i; but peer i is in the process of sending a large block of data to peer k due to its prior commitment and so is not be able to send a data block to peer j at a good bit-rate even though peer j is preferred to peer k.

This problem is solved on peer i working as a content upload peer by making the block size sent to peer k proportional to the value $V_n[k]$ of the normalized vector V, wherein varying block size is defined by:

$$\text{Block size sent}=V_n[k]*(\text{maximum block size})$$

The maximum block size is set to the MTU (Maximum Transfer Unit) of the transport protocol used in the current implementation. For example, the MTU of the UDP transport layer packet is 64 kB on most IP implementations.

Thus, the non-preferred peer k only gets a small data block from peer i, and correspondingly only uses the upload link of peer i for a small time period. Peer j on the other hand gets a data block having a larger size because $V_n[j]$ is larger than $V_n[k]$. In general, if peer k is not cooperating with other peers in the communication system 100 then its corresponding Vn[j] value will be very small on all peers and Peer k will receive choppy and low rate stream downloads from other peers. As a result peer k will also have to do a lot of transactions before it is able to download the whole media data stream. Therefore, the distributed block size varying scheme is reinforced for the case of the pull based approach.

Therefore, this block size adjusting scheme ascertains that a peer just operating as a content download peer receives the required entire media data stream the faster the more upload bandwidths it has spent to the other peers.

Fast Dynamics in the p2p Network

The peer selecting and block size adjusting scheme described above may slow down the dynamics as time progresses. This is an artifact of the asynchronous download behavior of the peers because peers may join or leave the overlay network 103 randomly at different times. Then, peers that participate and upload data blocks to other peers gain too much download bandwidth in the scheme, blocking off newer peers as explained below. The dynamics of the peer selecting and block size adjusting mechanism should be fast in order to change the elements of the normalized vector quickly as the overlay network 103 evolves with time.

The communication system 100 may not adapt fast enough to changes in the upload bandwidth being offered by other peers, possibly allowing peers to download data blocks of the media data stream who may not have contributed upload bandwidth to the communication system 100 in the recent past while denying contributing peers the corresponding advantage of fast stream downloads. This situation occurs on peer i when its vector V has a large value for V[j] because peer j contributed a lot of data blocks a long time ago but has since then not uploaded data blocks at all, while another peer k has joined the p2p network 103 recently but is consistently uploading useful stream blocks. The inertia due to V[j] being much greater than V[k] prevents peer i from suitable adapting to give peer k a higher priority than peer j. We therefore need to introduce a time-dependent utility to the contributions by various peers.

Therefore, a decay back-off mechanism is used to speed up the dynamics of the proposed method to counter this problem. In particular, the normalized vector V is "decayed", i.e. decreased by a decay factor ρ, with $0<\rho\leq1$ in each time interval. The time interval is a system specific parameter, for example of the order of 1 second). This parameter ensures that the communication system 100 adapts quickly changes in the upload bandwidth being offered by other peers.

In every time interval the vector V is recalculated:

$$V(\text{at time}=t+1)=V(\text{at time}=t)*\rho$$

For example, it is assumed that the vector is initially V(t)=[1 2 3 4] and ρ=0.8. After one time interval, V(t+1)=[0.8 1.6 2.4 3.2] and after two time intervals V(t+2)=[0.64 1.28 1.92 2.56]. If a data block arrives from the peer which correspond to element with index 0, then V increments V[0] by 1 and hence V=[1.64 1.28 1.92 2.56]. Thus peer 0 sent peer i a data block very recently, while as time progresses the contributions of those peers that contributed blocks a long time ago will be "forgotten".

Communication Protocol Specification

Figure 4:
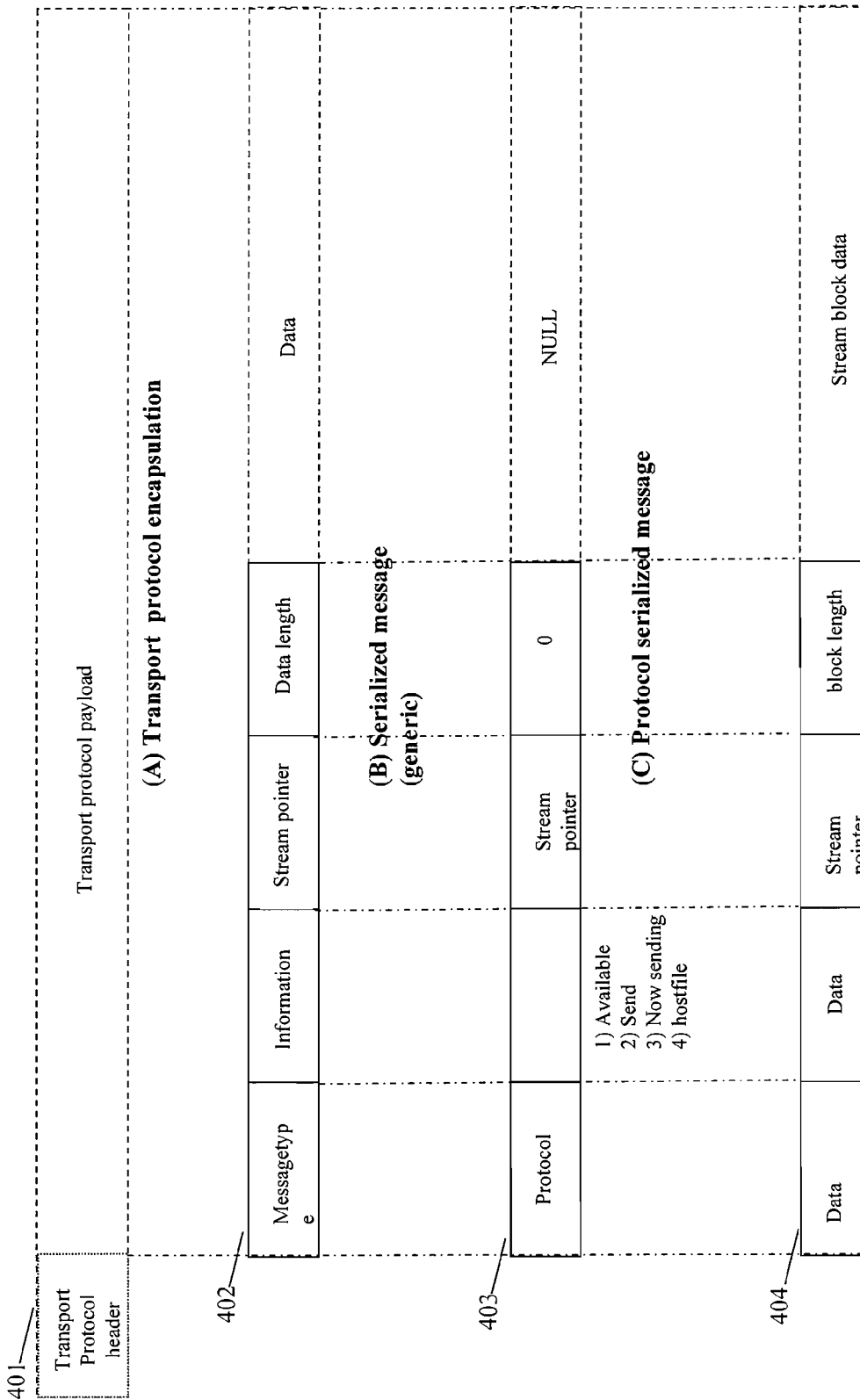
FIG. 4 shows two types of transport layer packets for transmitting via the network of FIG. 1.

FIG. 4 shows different types of messages used for communication in communication system 100.

The messages are classified into two types: protocol messages, e.g. message 403 and data messages, e.g. message 404. The protocol messages are used for asynchronous signaling between the peers of the distributed p2p network 103 while the data messages are used to upload data blocks with adjustable block size of the media data stream from a content uploading peer to a content downloading peer requesting these data blocks.

All messages are encapsulated in transport protocol packets as shown in message format 401. TCP or UDP may be used as a transport layer protocol.

The payload of a transport layer packet may thus comprise a p2p streaming protocol message.

Message format 402 shows a generic message (protocol or data) in serialized form. Whenever these messages are deserialized by deserializer 303 or constructed by the controller 305 of FIG. 3, they are stored in a <key, value> hash table for easy access by the controller 305.

A message first classifies its own type (protocol or data), and then contains some message specific parameters, as will be described below. When the message is stored as a hash table, all these parameters along with the message type constitute the key for the hash table and the remaining part of the message is stored as the value.

In the case of a protocol message, the message can be further classified as Available, Request to Send, NowSending, and HostFile depending on the type of control information enclosed in the protocol message 403. The classification types are defined as follows:

Available: An available message is sent as part of the "gossip push" component of the system. In this case the peer sends a proactive message to another peer advertising the last cached (received) byte number in form of a content pointer.

a) Request to Send: A Request to Send message signals the acceptance of a peer to download information from a content uploading peer, for example, the former peer may have received an available message from the latter peer and may want to download a stream block. The Request to Send message is also sent periodically to another peer as part of the pull-based approach of the system 100 to request for stream blocks. The corresponding timing diagram is shown in FIG. 6.

b) NowSending: A NowSending message is an acknowledgement from a content uploading peer indicating that it has accepted the Request to Send message and will be presently sending a block of the stream.

c) HostFile: Each peer exchanges a list of known neighbors with a randomly selected peer. This helps keep the list of online peers current on the peers.

A data message is shown in FIG. 4(D). Data message contains the size of the data block contained in a data message as well as the stream pointer of the first byte of the stream block in the overall stream. It is to be noted that the block size may vary as described above.

Referring to FIG. 6 which shows the timing diagram 605 for the operation of the push-based data dissemination. In particular, the corresponding timing diagram 605 shows the operation of the push based communication phase between two peers using the messages described above. In this case peer A, for example peer 102b advertises its content to peer B, e.g. peer 102a. The functional units 3 and 4 of FIG. 5 at peers A and B respectively are involved in the operation. The content pointer 602 of stream 601 cached at peer A is depicted in the FIG. 6. Stream 603 at peer B is also shown along with the stream pointer 604.

FIG. 7 shows the timing diagram for the working of the pull-based communication phase to download data. In this case peer A seeks to get data from peer B. The content pointer 702 also called stream pointer, of stream 701 at peer A is shown in FIG. 7. The stream 703 at the peer B is also shown along with the stream pointer 704.

Simulation Results

In order to evaluate the communication system 100 a simulation of 100 peers with one source host has been set up. Each peer including the source had an upload bandwidth of 1 Mbps and was connected to other peers via an Internet-type IP network. Each peer was supplied the addressing information about every other peer in the network by a tracker. A media data stream of a fixed length of 100 MB was used that was divided into 100 blocks with a block size of 1024 kB.

Figure 8A:
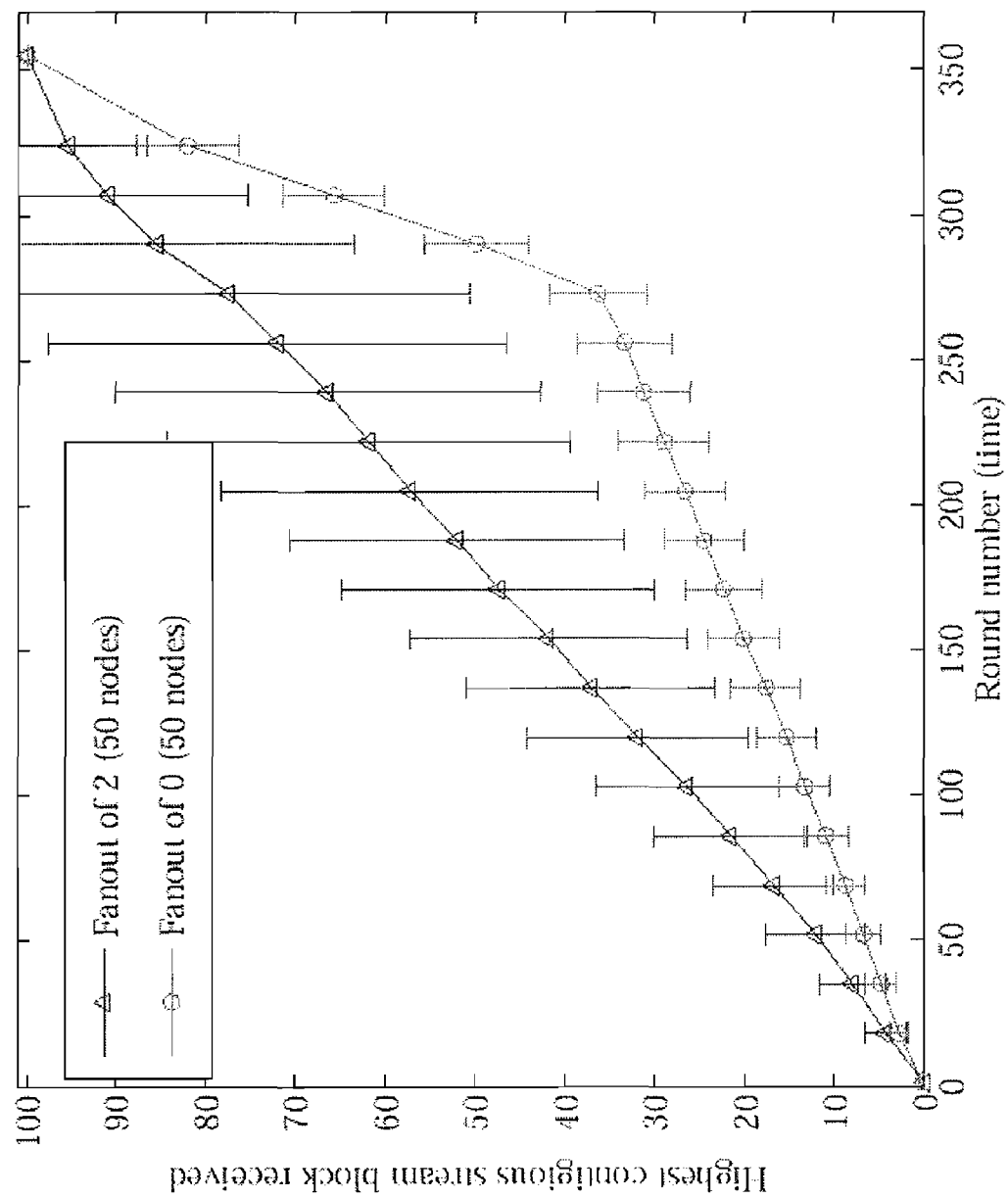
FIG. 8A shows a diagram according to a simulation depicting the difference in download rates of cooperative hosts and non-cooperative hosts.

FIG. 8(A) highlights the difference in the download rates of cooperative peers who contribute upload bandwidth equal to twice the bitrate of the video being shared (fanout=2) and non-cooperative peers who contribute no upload bandwidth, thus having a fanout of 0. As can be seen, cooperative peers are rewarded by faster stream download rates as compared to their non-cooperative peers.

As expected, peers who contributed upload bandwidth to the p2p network 103 were rewarded with higher download rates, as FIG. 7 indicates. There was a large variance in the download rate amongst the full-cooperative and to a lesser extent non-cooperative peers as indicated by the error bars of FIG. 8(A). We therefore ran additional simulations in order to verify the long term fairness of the system across multiple streams download.

Figure 8B:
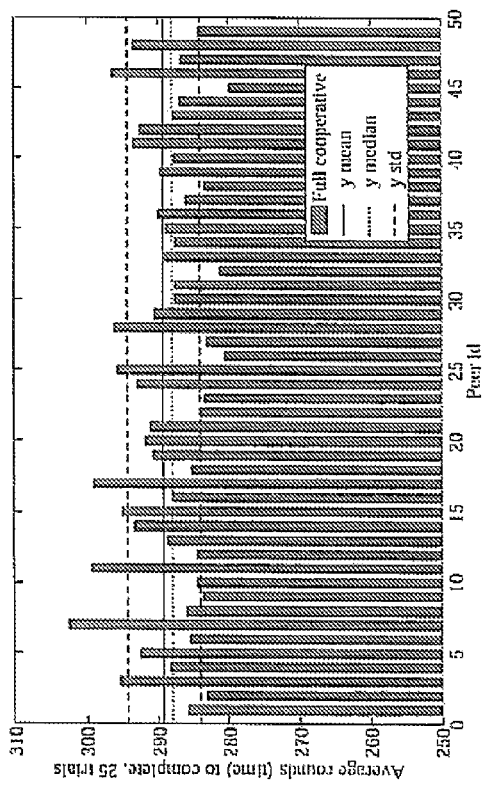
FIGS. 8B and 8C show diagrams depicting the average download time of cooperative and non-cooperative hosts.
Figure 8C:
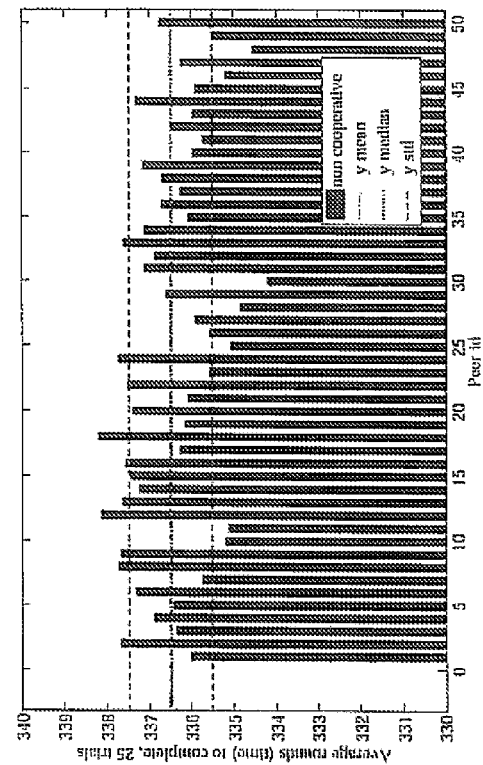

The bar graphs of FIGS. 8(B) and 8(C) show the average download time in seconds taken by 50 full-cooperative and 50 non-cooperative peers to receive the 100 stream blocks comprising the media stream. It is clear that on average, all peers (full-cooperative or non-cooperative) receive the similar quality of service depending on how much data blocks they upload to the p2p network.

What is claimed is:

1. A method for delivery of content data to a plurality of hosts, each host configured to operate as at least one of a content uploading host and a content downloading host, the plurality of hosts forming a peer-to-peer network, the method comprising:
   a) providing at least a part of the content data by a content uploading host of the plurality of hosts;
   b) selecting, at the content uploading host of the plurality of hosts, a content downloading host, wherein a probability of the content downloading host being selected is determined on the basis of an amount of content data sent from other hosts of the plurality of hosts, including the content downloading host, to the content uploading host;
   b1) advertising an available part of the content data from the content uploading host to the selected content downloading host;
   b2) sending a content block including a first part of the content data requested by the selected content downloading host from the content uploading host to the selected content downloading host;

c) selecting, at a second content downloading host, a second content uploading host;

c1) requesting at least a second part of the content data by the second content downloading host from the selected second content uploading host; and c2) sending, if available, a second content block including the second part of the content data requested by the second content downloading host from the second content uploading host to the second content downloading host, wherein at least one of step b2) and step c2) further comprises the step of adjusting a size of the content block in proportion to an amount of content data received by the content uploading host from the selected downloading host relative to the other hosts of the plurality of hosts.

2. The method of claim 1, wherein the content includes a media streaming the content data, the content data delivered block wise using predetermined transport layer packets.

3. The method of claim 1, wherein step b) comprises:
generating a vector at the content uploading host, wherein the vector includes a number of elements with each element representing the amount of content data received from a respective host which has sent content data to the content uploading host;
normalizing the vector by dividing each element by a sum of all elements;
generating a cumulative probability distribution function from the elements of the normalized vector;
generating a random number between 0 and 1;
choosing an interval defined by the cumulative probability distribution function in which the random number falls;
associating the chosen interval with an element of the normalized vector, and
selecting the content downloading host which corresponds to the associated element of the normalized vector.

4. The method of claim 3, wherein the elements of the normalized vector are multiplied with a decay factor every time unit and wherein the elements of the normalized vector are updated each time further content data are received at the content uploading host.

5. The method of claim 1, further comprising repeating steps b) to c2) at predetermined times until the content data has been delivered to one or more content downloading hosts.

6. The method of claim 1, wherein the step of adjusting the content block size comprises:
generating a vector at at least one of the content uploading host and the second content uploading host, which has received a request to send message from at least one of the content downloading host and the second content downloading host, wherein the vector includes a number of elements, each element representing the amount of content data received from a respective host which has sent content data to at least one of the content uploading host and the second content uploading host;
normalizing the vector by dividing each element by the sum of all elements; generating a cumulative probability distribution function from the elements of the normalized vector;
choosing the element of the normalized vector, which is associated with the content downloading host; and
sending to at least one of the content downloading host and the second content downloading host a content block with a size which is a proportional function of the chosen element of the normalized vector and a predetermined maximum block size.

7. The method of claim 1, wherein in step c) the second content uploading host is selected randomly by the second content downloading host in each of a plurality of time intervals.

8. The method of claim 1, wherein step b1) comprises:
advertising the available content from the content uploading host to the selected content downloading host in terms of a content pointer; and
comparing at the content downloading host a received content pointer with a local content pointer to decide whether or not the advertised available content is needed.

9. The method of claim 1, wherein step c1) comprises:
sending by the second content downloading host its local content pointer to the selected second content uploading host, and
comparing at the second content uploading host the received local content pointer with its content pointer to decide whether or not the requested part of content is available.

10. The method of claim 1, wherein the content to be delivered is initially stored or generated in real-time at a source host and wherein at least part of the content are sent to at least two of the plurality of hosts.

11. The method of claim 10, comprising:
storing address information of each host of the plurality of hosts, and
retrieving the stored address information by a host joining the peer-to-peer network from other hosts already connected to the peer-to-peer network.

12. The method of claim 1, further comprising adjusting for each host joining the peer-to-peer network the maximum block size to be used for uploading at least a part of the content to a content downloading host.

13. A communication system for delivery of content data in a peer-to-peer network, comprising:
a plurality of hosts forming the peer-to-peer network, each host being configured to at least one of upload and download at least a part of a content data to be delivered, wherein each host is adapted to upload at least a content data and includes:
a storage device for storing at least a part of the content data;
a first receiving device for receiving a first request-to-send message from a content downloading host,
a first controlling device for selecting a content downloading host, wherein a probability of the content downloading host being selected is determined proportionately on the basis of an amount of content data sent to the content uploading host from the content downloading host relative to other hosts of the plurality of hosts,
a generation device configured to generate a content block including the part of content data requested by the selected content downloading host and to adjust a size of the content block in proportion to the amount of content data received by the content uploading host from the selected downloading host relative to the other hosts of the plurality of hosts,
a first transmitting device configured to advertise, to the selected content downloading host, an available part of content data stored in the storage device and to send the content block with the adjustable block size to the selected content downloading host, the content block including the part of content data requested by the selected content downloading host; and each host adapted to download at least a part of a content data includes:
- a second storage device for storing at least a part of the content data received from at least one content uploading host,
- a second controlling device for selecting one of the at least one content uploading host,
- a second transmitting device configured to send a second request-to-send message for at least a part of the content data to the selected content uploading host, and
- a second receiving device configured to receive another content block from the selected content uploading host including the part of content data requested by the selected content downloading host.

14. The communication system of claim 13, wherein each host further comprises:
- a converting device for serializing packets dispensing from the at least one content uploading host and for deserializing packets arriving at the content uploading host to a hash table.

15. The communication system of claim 13, wherein a content pointer is associated with the content data stored in each content uploading and downloading host to indicate a current part or parts of content data stored therein, wherein each content uploading host includes a comparator device for determining whether the part of content data requested by the content downloading host is available and each content downloading host includes a comparator device for determining whether the part of content data advertised by a content uploading host is needed.

16. The communication system of claim 13, wherein the first controlling device of the content uploading host is configured to execute a method for delivery of content data to a plurality of hosts, each content host configured to operate as at least one of a content uploading host and a content downloading host, the plurality of hosts forming a peer-to-peer network, the method comprising:
a) providing at least a part of the content data by at least one content uploading host belonging to the plurality of hosts;
b) selecting another content downloading host, at the content uploading host, on the basis of the content data sent from other hosts of the plurality of hosts, including the selected content downloading host to the content uploading host;
b1) advertising an available part of the content data from the content uploading host to the selected content downloading host;
b2) sending a content block including the part of content data requested by the selected content downloading host from the content uploading host to the selected content downloading host, and c) selecting at a second content downloading host a second content uploading host;
c1) requesting at least a second part of the content data by the second content downloading host from the second selected content uploading host;
c2) sending, if available, a second content block including the second part of the content data requested by the second content downloading host from the second content uploading host to the second content downloading host, wherein the size of the second content block has been adjusted in a predetermined manner, wherein the parameter is a random number and step b) further comprises:
- generating a vector at the content uploading host, wherein the vector includes a number of elements with each element representing the amount of content data received from a respective host which has sent content data to the content uploading host;
- normalizing the vector by dividing each element by a sum of all elements;
- generating a cumulative probability distribution function from the elements of the normalized vector;
- generating a random number between 0 and 1;
- choosing an interval defined by the cumulative probability distribution function in which the random number falls;
- associating the chosen interval with an element of the normalized vector, and
- selecting the content downloading host which corresponds to the associated element of the normalized vector.

17. The communication system of claim 13, wherein the peer-to-peer network is an overlay network.

18. A method for delivery of content data to a plurality of hosts, each host configured to operate as at least one of a content uploading host and a content downloading host, the plurality of hosts forming a peer-to-peer network, the method comprising:
a) providing at least a part of the content data by a content uploading host of the plurality of hosts; and
b) selecting, at the content uploading host, a content downloading host of the plurality of hosts, wherein a probability of the content downloading host being selected is determined on the basis of the content data sent from other hosts of the plurality of hosts, including the content downloading host but not the content uploading host;
b1) advertising an available part of the content data from the content uploading host to the selected content downloading host; and
b2) sending a content block including a part of content data requested by the selected content downloading host from the content uploading host to the selected content downloading host; or:
c) selecting, at a second content downloading host, a second content uploading host;
c1) requesting at least a second part of the content data by the second content downloading host from the selected second content uploading host; and
c2) sending, if available, a second content block including the second part of the content data requested by the second content downloading host from the second content uploading host to the second content downloading host,
wherein at least one of step b2) and step c2) further comprises the step of adjusting a size of the content block in proportion to an amount of content data received by the content uploading host from the selected downloading host relative to the other hosts of the plurality of hosts.

* * * * *